(12) United States Patent
Jester

(10) Patent No.: US 7,288,316 B2
(45) Date of Patent: Oct. 30, 2007

(54) CYCLOOLEFIN COPOLYMER HEAT SEALABLE FILMS

(75) Inventor: Randy D. Jester, Greer, SC (US)

(73) Assignee: Topas Advanced Polymers, Inc., Florence, KY (US)

( * ) Notice: Subject to any disclaimer, the term of this patent is extended or adjusted under 35 U.S.C. 154(b) by 249 days.

(21) Appl. No.: 10/720,028

(22) Filed: Nov. 21, 2003

(65) Prior Publication Data

US 2005/0112337 A1    May 26, 2005

(51) Int. Cl.
*B32B 7/12* (2006.01)
*B32B 15/04* (2006.01)

(52) U.S. Cl. ............... 428/349; 428/500; 428/35.7; 428/516; 428/523; 428/343; 428/346; 428/347

(58) Field of Classification Search ........... 525/240; 428/35.7, 500, 523, 516, 349, 343, 346, 347
See application file for complete search history.

(56) References Cited

U.S. PATENT DOCUMENTS

| | | | |
|---|---|---|---|
| 5,532,030 A | 7/1996 | Hirose et al. | 428/35.7 |
| 5,750,262 A | 5/1998 | Gasse et al. | 428/423.5 |
| 5,755,081 A | 5/1998 | Rivett et al. | 53/477 |
| 5,783,270 A | 7/1998 | Fischer et al. | 428/35.2 |
| 5,912,070 A * | 6/1999 | Miharu et al. | 428/214 |
| 6,008,298 A | 12/1999 | Hatke et al. | 525/210 |
| 6,068,936 A | 5/2000 | Peiffer et al. | 428/500 |
| 6,383,582 B1 | 5/2002 | Salste et al. | 428/34.7 |
| 6,489,016 B2 | 12/2002 | Kishine | 428/213 |

FOREIGN PATENT DOCUMENTS

| | | |
|---|---|---|
| DE | 109 225 | 10/1974 |
| EP | 0 407 870 A2 | 1/1991 |
| EP | 0 485893 A1 | 5/1992 |
| EP | 849074 A2 * | 6/1998 |
| EP | 1 153 947 A1 | 11/2001 |
| JP | 05271484 * | 10/1993 |
| JP | 06271724 A * | 9/1994 |

(Continued)

OTHER PUBLICATIONS

Ionomer, acid copolymer, and metallocene polyethylene resins: A comparative assessment of sealant performance of James R. de Garaville, Tappi Journal, vol. 78, No. 6, pp. 191-203.

(Continued)

*Primary Examiner*—Michael C. Miggins
(74) *Attorney, Agent, or Firm*—Michael W. Ferrell

(57) ABSTRACT

The present invention relates to a heat-sealable film which consists essentially of a cycloolefin copolymer (COC), the glass transition temperature (Tg) of the COC being within the range from 30 to 55° C. The film or sheet has excellent low temperature heat-sealing properties and processing characteristics. The film may be free standing or laminated to other thermoplastic polymer film or films at low temperatures. Alternatively, a COC polymer with Tg in the range 30 to 55° C. may be coextruded with other thermoplastic polymer or polymer films in a coextrusion process to form a heat sealable film. The film of the invention is suitable for packing foods or other consumable items.

22 Claims, 7 Drawing Sheets

FOREIGN PATENT DOCUMENTS

WO  WO 02/066495 A2  8/2002
WO  WO 2004/094493 A1  11/2004

OTHER PUBLICATIONS

Kirk-Othmer Encyclopedia of Chemical Technology, 4th Ed., v. 10 (1993), pp. 774-783.

"C1-symmetric metallocenese for olefin polymerization, 1. Catalytic performance of [Me2C(3-tertBuCp)(Flu)]ZrCl2 in ethane/norbornene copolymerization", M. Arndt et al., Macromolecular Chemistry and Physics, Wiley VCH, Weinheim, DE, pp. 1221-1232, XP000776044; and.

"Ethene-Norbornene Copolymerization with Homogeneous Metallocene and Half-Sandwich Catalysts: Kinetics and Relationships between Catalyst Structure and Polymer Structure. 3. Copolymerization Parameters and Copolymerization Diagrams", Macromolecules, vol. 31, 1998, pp. 4681-4683, XP002316853.

* cited by examiner

CYCLOOLEFIN COPOLYMER HEAT SEALABLE FILMS

TECHNICAL FIELD

The present invention is directed to heat sealable cycloolefin copolymer (COC) films. The invention further relates to the use of the film in heat sealable laminates and to processes for production of heat sealed containers.

BACKGROUND OF THE INVENTION

Plastic films have widely been employed for use in, such as supermarkets and the like, for prepackaging various products including foods, such as vegetables and the like. See, for example, U.S. Pat. No. 6,489,016 which discloses multilayer packaging films of polyolefin. Also disclosing such packaging materials and packages made therefrom are U.S. Pat. Nos. 6,383,582; 5,750,262; 5,783,270; and 5,755,081; and Statutory Invention Registration No. H1727. Such prepackaging films serve for covering and enclosing commercial articles, such as foodstuffs including liquid foodstuffs, as individual articles or in a lot allotted or subdivided into small portions placed on a plastic carrier tray or the like. The success of such flexible packaging has been attributed to the broad use of thermoplastic heat sealants that are capable of providing the highest degree of package integrity, security and durability.

Furthermore, it is required for the prepackaging film that the film should be transparent and can easily be cut with an adequate extensible elasticity and an ability for adhering onto various surfaces, together with practical performance attributes such as resistance to fogging on the inner face when packaged, resistance to break-through upon heat sealing due to the heated pressing by the sealing bars, restorability from finger pressing and superior heat-sealability.

As is also well known, a "heat-seal" refers to the union of two films, e.g., a film and a thermoformed film/container or two portions of the same film, by bringing the films into contact with one another and then applying sufficient heat and pressure to the contacting regions of the films to cause the films to fuse together. Conventionally, but not necessarily always, the heat-seal is continuous and encircles the product to completely enclose the product within the two films, and is formed by a mechanism that includes a heated element (often referred to as a "seal-head") which is pressed onto the contacting regions of the films from one side of one of the films and typically presses the films against a non-heated backing element so that the films are pressed between the heated element and backing element for a period of time sufficient to effect a heat-seal. Alternatively, the films can be pressed between two heated elements or jaws to effect a heat seal.

The heat seal performance of thermoplastic materials is a complex function of time, temperature and pressure. J. R. de Garavilla, *Tappi Journal*, 191 (June 1995) describes the sealant performance of various ionomer, acid copolymer and metallocene polyethylene resins.

Packaging films from thermoplastic resins are typically made by melt extrusion. For melt extrusion, melt strength and extrusion processability of the polymer resin are some important characteristics. Resins capable of higher extruder output and requiring less energy to convert into film are preferred. Heat sealability at low temperatures (i.e., under 80° C.) is beneficial since it is more amenable to many commercial processes and allows for higher production speeds.

An object of the present invention is to provide a film for packaging applications. In particular it is an object of the present invention to provide films that can be heat sealed at relatively low temperatures and methods of packaging comprising films that can be heat-sealed at relatively low temperatures. It is a further object to provide a film which optionally can be laminated to thermoplastic polymers or metals at relatively low temperatures.

SUMMARY OF THE INVENTION

One or more of the above-mentioned objects are achieved by the provision of a film that can be heat sealed at about 50-80° C. The film consists essentially of a cycloolefin copolymer ("COC") wherein the COC polymer has a Tg in the range 30-55° C. The films exhibit superior sealing properties at low temperatures and surprising hot tack and ultimate seal strength over a broad temperature range making them suitable for a wide variety of applications and particularly robust for packaging applications.

The film of the present invention can be laminated in a separate step to one or more additional thermoplastic polymer layers and/or other layers to form a multilayer laminate or the COC polymer can be coextruded along with one or more thermoplastic resins to produce a multilayer laminate. In such multilayer, at least one layer is of the above-noted COC polymer, resulting in a film having a heat-sealable side made of the above-noted COC and optionally the other side is made of the other polymer. Constructions having more than two layers, but only one heat sealable side, may also be made in a similar manner, in which case, the above-noted COC layer forms an outer, heat sealable layer.

BRIEF DESCRIPTION OF DRAWINGS

The invention is described in detail below with reference to the Figures in which.

DETAILED DESCRIPTION OF THE INVENTION

Figure 1:
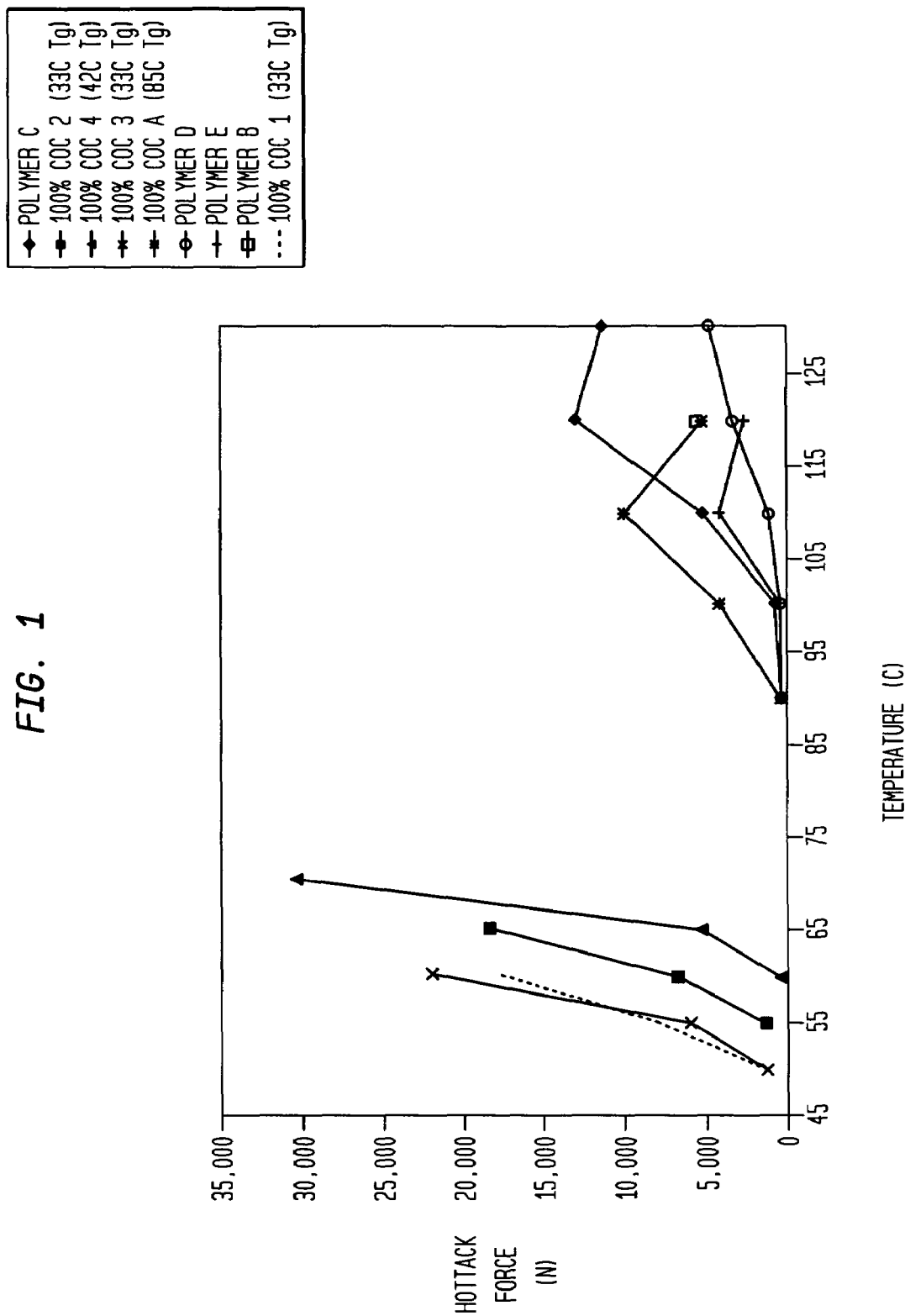
FIG. 1 is a plot of Hot-Tack Seal Strength versus sealing temperature for films of the invention and various other films.

The invention is described in detail below by reference to the various Figures and examples. Such illustration is for purposes of description only and is not limitative of the invention, the spirit and scope of which appears in the appended claims. Unless otherwise indicated, terms are to be construed in accordance with their ordinary meaning. The term "polymer" or "polymer resin", "polymeric" or the like includes, but is not limited to, homopolymers, copolymers, such as for example, block, graft, random and alternating copolymers, terpolymers, etc., and blends and modifications thereof, unless specifically stated otherwise, e.g. copolymer. "Polymer" or "polymer resin" shall also include all possible molecular configurations of the material. These structures include, but are not limited to, isotactic, syndiotactic and atactic (random) molecular configurations. "Mils" means thousandths of an inch.

Tg, or glass transition temperature of a polymer, can be tested by various methods. Preferably, Tg of the polymers of the instant invention is determined according to ASTM D3418-99. The test method consists generally of heating and cooling a polymer in a controlled environment while monitoring the difference in temperature between such polymer and a reference material.

Hot Tack Force Strength (Newtons) or "hot tack", the expression for the strength of a heat seal measured at a particular moment before the seal reaches ambient temperature, is measured pursuant to ASTM F1921-98 which is incorporated herein in its entirety by reference. A sample such as a film according to the present invention can be heat sealed wherein the resultant seal can be tested for its durability and resistance to disruptive forces while the seal is still hot. In general terms, the testing method includes applying pressure to a sample from two flat heated jaws under defined conditions of temperature, contact time and pressure such that the "sealing temperature" is the maximum temperature reached at the interface between the films being sealed while the jaws are in contact with and applying pressure on the films being sealed. After the sample is removed from the jaws but prior to reaching ambient temperature, the force required to essentially break the seal is measured.

The heat sealing temperature, heat seal temperature and like terminology thus refers to the temperature of the jaws or other sealing implements provided dwell time is sufficient; otherwise the sealing temperature is approximated as the surface temperature of the sealing implement or implements.

Ultimate seal strength as that term is used herein, also expressed in Newtons is the strength of a heat seal about 30 seconds after heat sealing, as is determined by the same method used to measure hot tack except that a 30 second cooling time is provided before the seal is broken. Sample testing parameters for both hot tack and ultimate seal strength are shown in Table 1 below:

TABLE 1

| Conditions | Hot Tack Strength | Ultimate Seal Strength |
|---|---|---|
| Seal Pressure: | 0.3034 N/mm^2 | 0.3034 N/mm^2 |
| Seal Time: | thickness <1 mil = 500 ms | thickness <1 mil = 500 ms |
| | thickness <2.5 mil = 1 sec | thickness <2.5 mil = 1 sec |
| Cool Time (Delay Time): | 100 ms | 30 seconds |
| Peel Speed (Clamp Separation Rate): | 200 mm/s (1200 cm/min) | 200 mm/s (1200 cm/min) |
| Force Range: | 10 Newtons | 100 Newtons |
| Samples Per Setting | 3 | 3 |
| Sample Width: | 15 mm, 25 mm, 1" | 15 mm, 25 mm, 1" |
| Sample Thickness: | Variable | Variable |
| Temperature Range: | Variable | Variable |

Alternate measuring means can be used to determine hot tack, for example ASTM D3706-88(2000), but for convenience results obtained pursuant to ASTM F1921-98 are used herein.

As used herein, the term "heat-seal" or the like terminology refers to the union of at least two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool. The terms "film" and "sheet" as used herein each refer to any expanse of material, whether a single layer or multiple layers, and are not limited as to thickness or configuration. While these terms often bring to mind a flat shape, the films of the present invention may be otherwise configured; for example, an annular film according to the present invention may be extruded from a die, and this film may be used in that configuration or may be subsequently slit open into a flat or curled sheet without departing from the essence of the present invention.

As used herein, the term "multilayer film" refers to a thermoplastic material, generally in sheet or web form, having one or more layers formed from polymeric or other materials which are bonded together by any conventional or suitable method, including one or more of the following methods: coextrusion, extrusion coating, lamination, vapor deposition coating, solvent coating, emulsion coating, or suspension coating.

As used herein, the terms "coextrusion," "coextrude," and the like refer to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "melting point" refers generally to the temperature at which a material transitions from solid to liquid.

In one embodiment, the present invention discloses a heat sealable film or sheet consisting essentially of COC polymer. The COC polymer has a Tg in the temperature range 30-55° C.

Suitable films may have, for example, from about 24 to about 30 mole percent norbornene and from about 76 to about 70 mole percent ethylene.

The cycloolefin polymer utilized as heat sealable layer in the invention is a cycloolefin copolymer. Useful cycloolefin copolymers are known in the art. For example, U.S. Pat. No. 6,068,936 (Assignee: Ticona GmbH) and U.S. Pat. No. 5,912,070 (Assignee: Mitsui Chemicals, Inc.) disclose several cycloolefin polymers and copolymers, the disclosures of which are incorporated herein in their entirety by reference.

The cycloolefin copolymer useful in the invention is a copolymer of an acyclic olefin and a cyclic olefin (or "cycloolefin") monomer which cyclic olefin monomer has (i) the polycyclic structure of formula I, II, III, IV, V or VI, or (ii) the monocyclic structure of the formula VII:

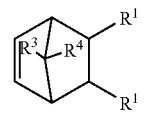

(I)

-continued

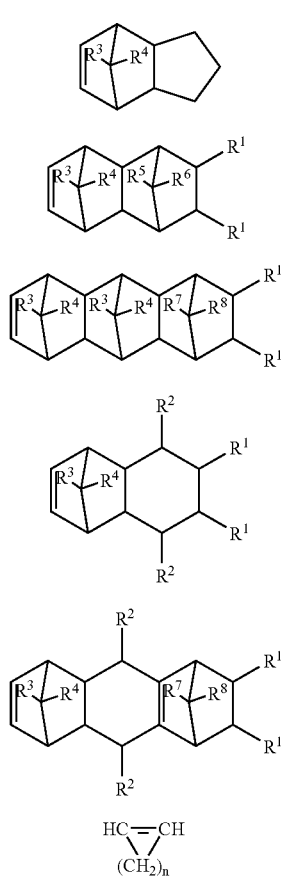

wherein $R^1$, $R^2$, $R^3$, $R^4$, $R^5$, $R^6$, $R^7$ and $R^8$ are the same or different and are H, a $C_6$-$C_{20}$-aryl or $C_1$-$C_{20}$-alkyl radical or a halogen atom, and n is a number from 2 to 10. Examples of such cyclic olefin monomers are norbornene, dimethyl-octahydro-naphthalene, cyclopentene and (5-methyl)norbornene and the like, or mixtures thereof. Examples of suitable acyclic olefin monomers are ethylene, propylene, butylene and the like, or mixtures thereof. Preferred cyclic olefin is norbornene, and preferred acyclic olefin is ethylene or propylene. An especially preferred cycloolefin copolymer is a copolymer of norbornene and ethylene, wherein said cycloolefin copolymer contains about 10-90 mole percent of norbornene residue and about 90-10 weight percent of ethylene residue. Several such polymers are available under the tradename TOPAS® from Ticona, Summit, N.J.

Another embodiment of the invention discloses a cycloolefin copolymer of norbornene and ethylene in a mole percent ration of about 15-30% norbornene and about 70-85 mole percent ethylene, said copolymer having a Tg in the range of about 30-55° C.

The cycloolefin polymers can be prepared with the aid of transition-metal catalysts, e.g. metallocenes. Suitable preparation processes are known and described, for example, in DD-A-109 225, EP-A-0 407 870, EP-A-0 485 893, U.S. Pat. Nos. 6,489,016, 6,008,298, 6,068,936, and 5,912,070, the disclosures of which are incorporated herein in their entirety by reference.

Molecular weight regulation during the preparation can advantageously be effected using hydrogen. Suitable molecular weights can also be established through targeted selection of the catalyst and reaction conditions. Details in this respect are given in the abovementioned specifications.

Cycloolefin copolymers which are suitable for the purposes of the present invention have a mean molecular weight $M_w$ (weight average) in the range from 1000 to 200,000, preferably from 100,000 to 150,000. Suitable COCs can be characterized by their glass transition temperature, Tg, which, for the purposes of their inventive use as resins for low temperature heat sealable layers, is in the range from 30 to 55° C. Such suitable COC polymers are available under the TOPAS® brand from Ticona, Incorporated, Summit, N.J. Additionally, preparation of COC copolymers from suitable monomers is disclosed, for example, in U.S. Pat. No. 6,489,016. The Tg of the polymers was determined by the Perkin Elmer "half Cp extrapolated" (the "half Cp extrapolated" reports the point on the curve where the specific heat change is half of the change in the complete transition) following the ASTM D3418 "Standard Test Method of Transition Temperatures of Polymers by Thermal Analysis" (American Society for Testing of Materials, Philadelphia, Pa.) noted above.

The above-described low temperature heat sealable COC films can be laminated to or coextruded with other thermoplastic layers. The polymers for such additional layers can be selected from the group consisting of polyolefin, polyamide, polyester, polyamide (including nylon), polyketone, polyketoamide, polycarbonate, ethylene/vinyl alcohol copolymer (EVOH), polyurethane, polyether, polyvinyl, polypropylene, cyclic olefin homopolymer and cyclic olefin copolymer and combinations thereof. Examples of suitable polymers are poly (m-xylene-adipamide) (MXD6), poly (hexamethylenesebacamide), poly(hexamethylene-adipamide) and poly(-caprolactam), polyesters such as poly(ethylene terephthalate) and polybutylene teraphthalate, polyurethanes, polyacrylonitriles, ethylene vinyl alcohol copolymers, ethylene vinyl acetate copolymers, polyesters grafted with maleic anhydride, PVdC, aliphatic polyketone, and LCP (liquid crystalline polymers). A suitable polyketone is exemplified by Carillon®, which is produced by Shell. A suitable liquid crystalline polymer is exemplified by Vectra®, which is produced by Ticona.

Some of the polyethylenes useful as thermoplastic polymers for lamination in accordance with this invention are referred to by terms such as LDPE, LLDPE, LMDPE, VLDPE, ULDPE, and the like. LDPE is a low density polyethylene homopolymer. Ethylene/alpha-olefin copolymers generally have a density in the range of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc. Sometimes linear polyethylene in the density range from about 0.926 to about 0.94 g/cc is referred to as linear medium density polyethylene (LMDPE). Lower density ethylene/alpha-olefin copolymers may be referred to as very low density polyethylene (VLDPE, typically used to refer to the ethylene/butene copolymers available from Union Carbide with a density ranging from about 0.88 to about 0.91 g/cc) and ultra-low density polyethylene (ULDPE, typically used to refer to the ethylene/octene copolymers supplied by Dow Chemical Company).

The thickness of the other thermoplastic films can be in the range 10 to 250 microns. Typical lamination conditions are adhesive lamination conditions. In addition to the other thermoplastic films described earlier, other useful thermoplastics are OPET ("Biaxially oriented polyethylene terephthalate") and OPP ("Biaxially oriented polypropylene").

Often OPET and OPP are reverse printed (printed on the side to be laminated to give high quality protected graphics). Also common is aluminum foil laminated to a sealant film. E.g. Capri Sun® (reverse printed OPET/adhesive/foil/adhesive/sealant).

Alternatively, the COC polymer described herein can be coextruded with other suitable thermoplastic polymers to produce a heat sealable laminate which can be heat sealed on the COC film side at low temperatures. A typical two-layer laminate of the present invention can be formed by extrusion or coextrusion of the COC polymer and the other thermoplastic polymer through a suitable die. The total thickness of the laminate can vary within broad limits and depends on the intended application.

Extrusion processes per se are well-known. In the inventive process, the COC and the other thermoplastic polymer are compressed and melted in an extruder, and subsequently extruded through a flat-film die, and the resultant film is taken off over one or more rolls for solidification, oriented if desired, subsequently heat-set if desired, and, corona- or flame-treated on the surface intended for treatment, if desired. Alternatively to a flat film process, a tubular film can be produced through the use of an annular die. The tubular film can be either single or multilayer. The tube can be quenched and collected for use in the final tubular shaped container or stretched and slit into a film.

In one preferred method for making a multi-component film or sheet according to the present invention, two extruders are used to extrude the two polymers having different melting points. A combining block is used to guide the polymers into a single die so that the lower melting COC polymer forms the outermost layers. In another preferred embodiment of this method, a multi-manifold die is used instead of the combining block and die. When more than two polymers are used, one extruder is needed for each polymer. The extruders, dies, and combining blocks useful in the practice of the present invention are those well-known to those skilled in the art. It is contemplated that a wide variety of such equipment may be used in various combinations, the choice of which partly will depend upon the polymers that are used and the number and thicknesses of the layers that are desired.

Films are suitably prepared by way of flat die or blown film techniques described in Kirk-Othmer, *Encyclopedia of Chemical Technology*, Fourth Edition (1993), Volume 10, pp. 775-778, the disclosure of which is incorporated herein by reference.

The main variations of melt extrusion are the slot (or flat) die-cast film process and the blown films process. These may be combined with one or more steps such as coextrusion wherein multilayer film or sheet is formed, biaxial orientation, and in-line coating.

The simplest form of melt extrusion is the use of a slot die to form the molten polymer into a thin flat profile which is then quenched immediately to a solid state. This is usually done by contacting the hot web very quickly on a chilled roll or drum. A liquid quenching bath may be used in place of or contiguous to the chill roll. Depending on the polymer type or formulation, the quenched web is generally substantially amorphous. In some cases, the web may be drawn down in thickness by overdriving the quenching roll relative to the extrusion velocity. The most critical factor in the slot-film process is the design of the die. The control of transverse gauge is extremely important and requires some form of cross-web gauge adjustment. Mechanical alternation of the die gap across the web may be done by using precisely controlled bolt action on the die lips, or by controlled application of heat in small increments across the die. Interior die geometry must be carefully designed to accommodate the flow and shear characteristics of the particular polymer being used. Care must be taken to prevent melt fracture by adjusting die characteristics to extrusion rate, drawdown, viscosity, and temperature.

The blown or tubular film process provides a low cost method for production of thin films. In this process, the hot melt is extruded through an annular circular die either upward or downward and, less frequently, horizontally. The tube is inflated with air to a diameter determined by the desired film properties and by practical handling considerations. This may vary from as small as a centimeter to over a meter in diameter.

As the hot melt emerges from the die, the tube is expanded by air to two or three times its diameter. At the same time, the cooled air chills the web to a solid and impact properties. The point of air impingement and the velocity and temperature of the air must all be controlled to give the optimum physical properties to the film. The film tube is collapsed within a V-shaped frame of rollers and is nipped at the end of the frame to trap the air within the bubble. The nip rolls also draw the film away from the die. The draw rate is controlled to balance the physical properties with the transverse properties achieved by the blow draw ratio. The tube may be wound as such or may be slit and wound onto one or more rolls. The blown film technique is used to produce tailored film products by coextruding one or more polymer types in two or more layers of melt. In this fashion the benefits of specific polymer types or formulations may be combined. Thus high cost barrier resins may be combined with a low cost thicker layer of standard resin to achieve an optimum barrier film at lower cost. Thin slip-control layers may be used on the surface of a bulk layer of optically clear resin to obtain an aesthetic film with good handleability. Lower melting outer layers of the present invention are used to provide heat sealing.

In yet another embodiment of the invention, the multilayer laminate can be prepared by adhesion rather than extrusion.

In another embodiment of the invention, the layers of the laminate can be prepared by molding processes such as, for example, blow molding, injection molding and the like.

Another embodiment of the invention relates to a method of bringing together a COC polymer of the invention with itself, another COC polymer film, another thermoplastic polymer film, or a combination of the above in one or more forms. The method comprises bringing together the film or films desired into intimate physical contact, and applying pressure at about 50-80° C.

The inner layers of the film or sheet need not all have the same melting point, but they should have melting points sufficiently higher than the melting point of the outer COC layer so that the outer layer may be melted without melting that inner layer. This arrangement of layers allows the outer layer to be melt laminated or bonded or sealed to other objects while the inner layers maintain their shape, structure, rigidity, and other physical properties.

Alternately, two COC polymer films of the present invention may be melt or heat sealed to each other.

In yet another embodiment, the COC polymer film can be folded back onto itself and heat sealed.

Other useful processes of forming packages with the inventive films include, for example, instances where such packages are formed by first thermoforming the inventive polymeric film, laminate or foamed sheet into a desired shape for containment of a product therein, positioning the product within the so-formed container, placing another object (e.g. a polymeric film, paper, cardboard, metal object and the like) and then heat sealing the container and object together in such a manner that the product may be enclosed between the object and the container. In yet another process, the inventive polymeric film, laminate or foamed sheet can be formed into a pouch, heat sealing closed all but one of the open edges thereof, filling the pouch with a product (e.g., a solid or a liquid) via the open edge, and then heat sealing closed the remaining open edge to enclose the product. Such processes are well known in the art of packaging.

Multilayer films in accordance with the present invention may be cross-linked if desired, e.g., to increase the structural strength of the film at elevated temperatures and/or to increase the force at which the material can be stretched before tearing apart. Cross-linking is preferably done by irradiation, i.e., bombarding the film with particulate or non-particulate radiation such as high-energy electrons from an accelerator or cobalt-60 gamma rays. Any conventional cross-linking technique may be used. For example, electronic cross-linking may be carried out by curtain-beam irradiation. Chemical cross-linking techniques may also be employed, e.g., by the use of peroxides.

The present invention is not limited with respect to the thickness of the layers or of the multi-layer sheet as a whole, nor with respect to the number of layers in the sheet. These variables can be determined based upon need and based upon the capabilities of the equipment that is available.

The invention is described in detail below by reference to the various examples. Such illustration is for purposes of description only and is not limitative of the invention, the spirit and scope of which appears in the appended claims. Unless otherwise indicated, terms are to be construed in accordance with their ordinary meaning. Many variations of the present invention will occur to those skilled in the art. The present invention is not limited to the embodiments illustrated and described herein, but encompasses all the subject matter within the scope of the appended claims.

EXAMPLE 1

Preparation of a Cyclo-Olefin/Ethylene Copolymer (See U.S. Pat. No. 6,008,298).

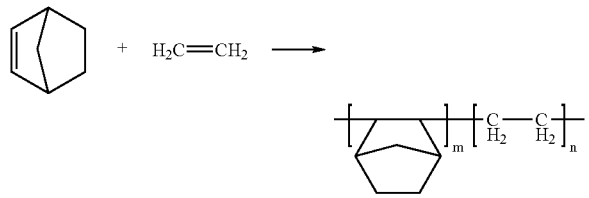

A clean and dry 75 dm$^3$ polymerization reactor with a stirrer was flushed with nitrogen and then with ethylene and filled with 12 kg of norbornene and 15 dm$^3$ of toluene. 300 ml of triisobutylaluminum solution (20% w/w in toluene) were added. The ethylene pressure was adjusted to an increased pressure of 18 bar. The reaction temperature was adjusted to 70° C. 20 mg of isopropenyl-(cyclopentadienyl)(1-indenyl)-zirconium dichloride were dissolved in 500 ml of a toluene solution of methylaluminoxane (10% by weight of methylaluminoxane of molecular weight 1300 g/mol according to cryoscopic determination) and the solution was then metered into the reactor. The ethylene pressure was kept at 18 bar by topping up. After a polymerization time of 90 minutes, the contents of the reactor were emptied into a 150 dm$^3$ stirred tank into which 500 g of Celite and 200 ml of water in 50 dm$^3$ of a hydrogenated diesel oil fraction (Exxsol, boiling range 100 to 120° C. from Exxon) had been initially introduced. The mixture was stirred at 60° C. for 20 minutes. A filter cake of 500 g of Celite suspended in 10 dm$^3$ of Exxsol was built up on the filter fabric of a 120 dm$^3$ pressure suction filter. The polymer solution was filtered over the pressure suction filter. A nitrogen pressure of 2.8 bar was built up over the solution. The mixture was then filtered over seven filter candles (Fluid Dynamics, Dynalloy XS 64.5 µm 0.1 m$^2$/candle), which were mounted in a steel housing. The polymer solution was stirred into 500 dm$^3$ of acetone by means of a disperser (Ultraturrax) and thereby precipitated. The suspension was circulated over a 680 dm$^3$ stirred pressure suction filter with the bottom valve open. After the bottom valve had been closed, the residue was washed three times with 200 dm$^3$ of acetone. After the last washing, the product was pre-dried in a stream of nitrogen at 60° C. and dried in a drying cabinet for 24 hours under 0.2 bar and at 80° C. 5.37 kg of polymer were obtained. The viscosity number was 51 ml/g and the glass transition temperature was 105° C.

By varying the norbornene content in the above-described process, COC polymers of varying Tg could be prepared. Generally, reducing the norbornene content and increasing the ethylene correspondingly reduced the Tg. In generally, the Tg of the polymers of the invention follow the relationship $$\text{Norbornene Content} = \frac{(Tg + 65)}{4.}$$

The following Table 2 lists the various COC polymers that were prepared thus, along with their monomer ratios and Tg.

TABLE 2

Tg of Selected Polymers

| Description | Designation | Norbornene Content, Mole % | Tg ° C. |
|---|---|---|---|
| COC Copolymer | COC A | 36% | 78 |
| COC Copolymer | COC 1 | 25% | 33 |
| COC Copolymer | COC 2 | 25% | 33 |
| COC Copolymer | COC 3 | 25% | 33 |
| COC Copolymer | COC 4 | 27% | 44 |
| Claim ?? Copolymer | Polymer B | 0 | 127 |
| Commercial Heat-Sealable Film | Polymer C | 0 | — |
| LLDPE | Polymer D | 0 | — |
| LLDPE | Polymer E | 0 | — |

As previously mentioned, the strength and durability of a heat seal is essential for packaging purposes. For example, the strength of a package can be correlated with the strength of a heat seal. Heat seals made with the films of the present invention are surprisingly strong even at low heat sealing temperatures as demonstrated by their hot tack force strength and ultimate seal strength.

Specific hot tack strength measurement results of various COC films of the present invention, blends and commercial films are show in Samples 1 through 21 below and ultimate seal strength measurements of various COC polymers of the present invention, blends and commercial films are shown below in Samples 21 through 29. The data are also plotted in FIGS. 1 through 5. The Samples are for illustrative purposes only and are not limitative of the invention.

Specific testing conditions for hot tack measurements are shown in the Hot Tack Conditions chart below and apply to Samples 1 through Sample 13 of Table 3.

| Hot Tack Conditions | |
| --- | --- |
| Seal Pressure = | 0.3034 N/mm^2 or 44 psi |
| Seal Time = | 1.0 s |
| Cool Time = | 0.1 s |
| Peel Speed = | 200 mm/s |
| Sample Width = | 1.0" or 25.4 mm |
| Sample Thickness = | 2 mil |

TABLE 3

| Hot Tack Strength | | |
| --- | --- | --- |
| Temperature ° C. | Avg. Force | Seal Type |
| Sample 1: 80% Polymer D + 20% COC 1 | | |
| 90 | 1.464 | No Seal |
| 100 | 1.976 | No Seal |
| 110 | 6.685 | Peeled at Seal Zone |
| Sample 2: 60% Polymer D + 40% COC 1 | | |
| 90 | 1.555 | No Seal |
| 100 | 2.367 | Weak Seal |
| 110 | 6.052 | Peeled at Seal Zone |
| Sample 3: 40% Polymer D + 60% COC 1 | | |
| 90 | 1.846 | No Seal |
| 100 | 1.938 | No Seal |
| 110 | 4.032 | Slight Elongation at Seal Zone |
| 120 | 5.954 | Peeled at Seal Zone |
| Sample 4: 20% Polymer D + 80% COC 1 | | |
| 90 | 1.594 | No Seal |
| 100 | 2.102 | No Seal |
| 110 | 5.467 | Slight Elongation/Peeling at Seal Zone |
| 120 | 6.512 | Peeled at Seal Zone |
| Sample 5: COC 3 + .2% Licowax C | | |
| 50 | 1.055 | No Seal |
| 55 | 5.803 | Good Seal |
| 60 | 21.872 | Peeled From Laminate |
| Sample 6: COC 4 + .2% Licowax C | | |
| 60 | 0.393 | No Seal |
| 65 | 5.151 | Good Seal |
| 70 | 30.330 | Peeled at Seal Zone |
| Sample 7: COC 2 + .2% Licowax C | | |
| 55 | 1.259 | No Seal |
| 60 | 6.523 | Good Seal |
| 65 | 18.179 | Peeled From Laminate |
| Sample 8: COC 1 + .2% Licowax C | | |
| 50 | 1.109 | No Seal |
| 55 | 7.707 | Good Seal |
| 60 | 17.440 | Peeled from Laminate |
| Sample 9: 100% COC A | | |
| 90 | 0.218 | No Seal |
| 100 | 4.040 | Weak Seal |
| 110 | 9.796 | Adhesive Seal Failure |
| 120 | 5.194 | Material Break |
| 130 | 3.546 | Material Break |

TABLE 3-continued

| Hot Tack Strength | | |
| --- | --- | --- |
| Temperature ° C. | Avg. Force | Seal Type |
| Sample 10: Polymer C | | |
| 90 | 0.279 | |
| 100 | 0.722 | |
| 110 | 5.125 | |
| 120 | 12.934 | |
| 130 | 11.279 | |
| 140 | 7.229 | |
| Sample 11: 100% Polymer D | | |
| 90 | 0.248 | No Seal |
| 100 | 0.293 | No Seal |
| 110 | 1.049 | No Seal |
| 120 | 3.274 | Weak Seal |
| 130 | 4.777 | Weak Seal/Partial Peeling |
| Sample 12: 100% Polymer E | | |
| 90 | 0.255 | No Seal |
| 100 | 0.267 | Weak Seal |
| 110 | 4.101 | Peeled at Seal Zone |
| 120 | 2.690 | Peeled at Seal Zone |
| Sample 13: Polymer B | | |
| 120 | 5.6 | |

Specific testing conditions for additional hot tack measurements are shown in the chart below and apply to Samples 14 through Sample 21 of Table 4.

| Hot Tack Conditions | |
| --- | --- |
| Seal Pressure = | 0.3034 N/mm^2 or 44 psi |
| Seal Time = | 1.0 s |
| Cool Time = | .1 s |
| Peel Speed = | 200 mm/s |
| Sample Width = | 1.0" or 25.4 mm |
| Sample Thickness = | 2 mil |

TABLE 4

| Hot Tack Strength | | |
| --- | --- | --- |
| Temperature ° C. | Avg. Force | Seal Type |
| Sample 14: 80% Polymer D + 20% COC 1 | | |
| 90 | 1.464 | No Seal |
| 100 | 1.976 | No Seal |
| 110 | 6.685 | Peeled at Seal Zone |
| Sample 15: 60% Polymer D + 40% COC 1 | | |
| 90 | 1.555 | No Seal |
| 100 | 2.367 | Weak Seal |
| 110 | 6.052 | Peeled at Seal Zone |
| Sample 16: 40% Polymer D + 60% COC 1 | | |
| 90 | 1.846 | No Seal |
| 100 | 1.938 | No Seal |
| 110 | 4.032 | Slight Elongation at Seal Zone |
| 120 | 5.954 | Peeled at Seal Zone |
| Sample 17: 20% Polymer D + 80% COC 1 | | |
| 90 | 1.594 | No Seal |
| 100 | 2.102 | No Seal |
| 110 | 5.467 | Slight Elongation/Peeling at Seal Zone |
| 120 | 6.512 | Peeled at Seal Zone |
| Sample 18: COC 3 + .2% Licowax C | | |

TABLE 4-continued

Hot Tack Strength

| Temperature ° C. | Avg. Force | Seal Type |
|---|---|---|
| 50 | 1.055 | No Seal |
| 55 | 5.803 | Good Seal |
| 60 | 21.872 | Peeled From Laminate |
| 65 | 15.557 | Peeled From Laminate |
| 70 | 13.321 | Peeled From Laminate |
| 75 | 11.893 | Partial Peeled From Laminate |
| 80 | 11.891 | Peeled From Laminate |
| 85 | 12.817 | Peeled From Laminate |
| 90 | 9.904 | Peeled at Seal Zone |
| 100 | 9.109 | Peeled at Seal Zone |
| 110 | 7.389 | Peeled at Seal Zone |
| 120 | 7.180 | Peeled at Seal Zone |
| 130 | 7.379 | Peeled at Seal Zone |
| 140 | 7.879 | Peeled at Seal Zone |
| 150 | 5.868 | Peeled at Seal Zone |
| 160 | 6.824 | Peeled at Seal Zone |
| 170 | 8.198 | Peeled at Seal Zone |
| 180 | 7.695 | Peeled at Seal Zone |
| Sample 19: COC 4 + .2% Licowax C | | |
| 60 | 0.393 | No Seal |
| 65 | 5.151 | Good Seal |
| 70 | 30.330 | Peeled at Seal Zone |
| 75 | 8.277 | Peeled at Seal Zone |
| 80 | 14.568 | Peeled at Seal Zone |
| 90 | 14.558 | Peeled from Laminate |
| 100 | 7.067 | Peeled at Seal Zone |
| 110 | 10.883 | Peeled at Seal Zone |
| 120 | 7.751 | Peeled at Seal Zone |
| 130 | 8.885 | Peeled at Seal Zone |
| 140 | 8.467 | Peeled from Laminent |
| 150 | 6.140 | Peeled at Seal Zone |
| 160 | 6.340 | Peeled at Seal Zone |
| 170 | 3.806 | Peeled at Seal Zone |
| Sample 20: COC 2 + .2% Licowax C | | |
| 55 | 1.259 | No Seal |
| 60 | 6.523 | Good Seal |
| 65 | 18.179 | Peeled From Laminate |
| 70 | 15.778 | Peeled From Laminate |
| 75 | 12.007 | Peeled at Seal Zone |
| 80 | 11.689 | Peeled at Seal Zone |
| 90 | 7.912 | Peeled at Seal Zone |
| 100 | 8.724 | Peeled at Seal Zone |
| 110 | 6.102 | Peeled at Seal Zone |
| 120 | 7.631 | Peeled at Seal Zone |
| 130 | 9.070 | Peeled from Laminent |
| 140 | 7.618 | Peeled at Seal Zone |
| 150 | 6.918 | Peeled at Seal Zone |
| 160 | 7.910 | Peeled at Seal Zone |
| 170 | 5.835 | Peeled at Seal Zone |
| 180 | 6.294 | Peeled at Seal Zone |
| Sample 21: COC 1 + .2% Licowax C | | |
| 50 | 1.109 | No Seal |
| 55 | 7.707 | Good Seal |
| 60 | 14.597 | Peeled from Laminate |
| 65 | 15.357 | Peeled at Seal Zone |
| 70 | 12.717 | Peeled from Laminate |
| 75 | 12.068 | Peeled at Seal Zone |
| 80 | 10.140 | Peeled at Seal Zone |
| 90 | 6.808 | Peeled at Seal Zone |
| 100 | 6.760 | Peeled at Seal Zone |
| 110 | 5.608 | Peeled at Seal Zone |
| 120 | 5.808 | Peeled at Seal Zone |
| 130 | 4.795666667 | Peeled at Seal Zone |
| 140 | 4.604666667 | Peeled at Seal Zone |
| 150 | 5.32 | Peeled at Seal Zone |
| 160 | 4.510333333 | Peeled at Seal Zone |
| 170 | 4.129 | Peeled at Seal Zone |
| 180 | 5.524 | Peeled at Seal Zone |

Specific testing conditions for ultimate seal strength measurements are shown in the chart below and apply to Samples 22 through Sample 34 of Table 5.

Ultimate Seal Conditions

| | |
|---|---|
| Seal Pressure = | 0.3034 N/mm^2 or 44 psi |
| Seal Time = | 1.0 s |
| Cool Time = | 30 s |
| Peel Speed = | 200 mm/s |
| Sample Width = | 1.0" or 25.4 mm |
| Sample Thickness = | 2 mil |

TABLE 5

Ultimate Seal Strength

| Temperature ° C. | Avg. Force | Seal Type |
|---|---|---|
| Sample 22: 80% Polymer D + 20% COC 1 | | |
| 90 | 0.817 | No Seal |
| 100 | 3.039 | No Seal |
| 110 | 30.059 | Peeled From Laminate |
| Sample 23: Polymer D: 60% + 40% COC 1 | | |
| 90 | 0.949 | No Seal |
| 100 | 4.146 | Weak Seal |
| 110 | 32.684 | Peeled From Laminate |
| Sample 24: Polymer D: 40% + 60% COC 1 | | |
| 90 | 0.761 | No Seal |
| 100 | 1.580 | No Seal |
| 110 | 26.899 | Elongation at Seal Zone |
| 120 | 31.349 | Elongation at Seal Zone |
| Sample 25: 20% Polymer D + 80% COC 1 | | |
| 90 | 0.667 | No Seal |
| 100 | 2.503 | No Seal |
| 110 | 5.109 | Weak Seal |
| 120 | 32.607 | Elongation at Seal Zone |
| Sample 26: COC 3 + .2% Licowax C | | |
| 60 | 1.015 | No Seal |
| 65 | 21.595 | Good Seal |
| 70 | 32.442 | Peeled from Laminate |
| 75 | 36.354 | Elongation at Seal Zone |
| Sample 27: COC 4 + .2% Licowax C | | |
| 60 | 0.071 | No Seal |
| 70 | 1.769 | No Seal |
| 80 | 11.064 | Good Seal |
| 90 | 28.482 | Strong Seal, Slipped From Grip |
| Sample 28: COC 2 + .2% Licowax C | | |
| 60 | 0.470 | No Seal |
| 70 | 21.652 | Good Seal |
| 80 | 40.495 | Peeled From Laminate |
| Sample 29: COC 1 + .2% Licowax C | | |
| 60 | 0.557 | Good Seal |
| 70 | 26.838 | Good Seal |
| 80 | 31.203 | Peeled at Seal Zone |
| Sample 30: 100% COC A | | |
| 90 | 0.113666667 | No Seal |
| 100 | 1.108 | Weak Seal |
| 110 | 10.90233333 | Adhesive Seal Failure |
| 120 | 51.994 | Clamps Timed Out, Seal Not Peeled |
| 130 | 53.98666667 | Clamps Timed Out, Seal Not Peeled |
| 130 | | Clamps Timed Out, Seal Not Peeled |
| 140 | 48.4950 | Seal Pulled From Laminant |
| Sample 31: Polymer C | | |
| 100 | 2.57 | Faint Seal |
| 110 | 41.60 | Good Seal |
| 120 | 57.10 | Good Seal (material pulled out of |

TABLE 5-continued

Ultimate Seal Strength

| Temperature ° C. | Avg. Force | Seal Type |
|---|---|---|
| 130 | 56.48 | Good Seal (material pulled out of grips) |
| Sample 32: 100% Polymer D | | |
| 90 | 0.085 | No Seal |
| 100 | 3.704 | Weak Seal |
| 110 | 23.714 | Mostly Peeled From Laminant |
| 120 | 22.821 | Peeled From Laminant |
| Sample 33: 100% Polymer E | | |
| 90 | 0.213 | No Seal |
| 100 | 1.655 | No Seal |
| 110 | 25.851 | Peeled Partially From Laminant |
| 120 | 25.598 | Peeled From Laminant |
| Sample 34: Polymer B | | |
| 100 | 29 | |

Specific testing conditions for additional ultimate seal strength measurements are shown in the chart below and apply to Samples 35 to 42 of Table 6.

Ultimate Seal Conditions

| | |
|---|---|
| Seal Pressure = | 0.3034 N/mm^2 or 44 psi |
| Seal Time = | 1.0 s |
| Cool Time = | 30 s |
| Peel Speed = | 200 mm/s |
| Sample Width = | 1.0" or 25.4 mm |
| Sample Thickness = | 2 mil |

TABLE 6

Ultimate Seal Strength

| Temperature ° C. | Avg. Force | Seal Type |
|---|---|---|
| Sample 35: 80% Polymer D + 20% COC 1 | | |
| 90 | 0.817 | No Seal |
| 100 | 3.039 | No Seal |
| 110 | 30.059 | Peeled From Laminate |
| Sample 36: 60% Polymer D + 40% COC 1 | | |
| 90 | 0.949 | No Seal |
| 100 | 4.146 | Weak Seal |
| 110 | 32.684 | Peeled From Laminate |
| Sample 37: 40% Polymer D + 60% COC 1 | | |
| 90 | 0.761 | No Seal |
| 100 | 1.580 | No Seal |
| 110 | 26.899 | Elongation at Seal Zone |
| 120 | 31.349 | Elongation at Seal Zone |
| Sample 38: 20% Polymer D + 80% COC 1 | | |
| 90 | 0.667 | No Seal |
| 100 | 2.503 | No Seal |
| 110 | 5.109 | Weak Seal |
| 120 | 32.607 | Elongation at Seal Zone |
| Sample 39: COC 3 + .2% Licowax C | | |
| 60 | 1.015 | No Seal |
| 70 | 32.442 | Peeled from Laminate |
| 75 | 36.354 | Elongation at Seal Zone |
| 80 | 38.135 | Peeled from Laminate |
| 90 | 35.974 | Peeled from Laminate |
| 100 | 28.749 | Elongation at Seal Zone |

TABLE 6-continued

Ultimate Seal Strength

| Temperature ° C. | Avg. Force | Seal Type |
|---|---|---|
| 110 | 28.890 | Elongation at Seal Zone |
| 120 | 28.676 | Elongation at Seal Zone |
| 130 | 27.608 | Peeled from Laminate |
| 140 | 27.906 | Peeled from Laminate |
| Sample 40: COC 4 + .2% Licowax C | | |
| 60 | 0.071 | No Seal |
| 65 | 0.265 | No Seal |
| 70 | 1.769 | No Seal |
| 75 | 7.960 | Good Seal |
| 80 | 11.064 | Good Seal |
| 90 | 32.782 | Strong Seal, Slipped From Grip |
| 100 | 39.560 | Peeled from Laminate |
| 110 | 32.181 | Good Seal |
| 120 | 29.050 | Good Seal |
| 130 | 33.337 | Peeled from Laminate |
| 140 | 26.576 | Peeled from Laminate |
| Sample 41: COC 2 + .2% Licowax C | | |
| 60 | 0.470 | No Seal |
| 65 | 1.668 | Weak Seal |
| 70 | 21.652 | Good Seal |
| 75 | 28.166 | Good Seal |
| 80 | 40.495 | Peeled From Laminate |
| 90 | 37.831 | Peeled From Laminate |
| 100 | 34.475 | Peeled From Laminate |
| 110 | 32.837 | Peeled From Laminate |
| 120 | 30.756 | Peeled From Laminate |
| 130 | 28.964 | Peeled from Laminate |
| 140 | 26.247 | Peeled from Laminate |
| 150 | 24.841 | Peeled from Laminate |
| 160 | 27.705 | Peeled from Laminate |
| Sampl 42: COC 1 + .2% Licowax C | | |
| 60 | 0.557 | No Seal |
| 65 | 2.447 | Good Seal |
| 70 | 26.838 | Good Seal |
| 75 | 26.683 | Strong Seal, Slipped from Grip |
| 80 | 31.203 | Peeled at Seal Zone |
| 90 | 37.009 | Peeled at Seal Zone |
| 100 | 42.613 | Peeled From Laminate |
| 110 | 38.248 | Peeled From Laminate |
| 120 | 32.195 | Peeled From Laminate |
| 130 | 27.080 | Peeled from Laminate |
| 140 | 26.525 | Peeled from Laminate |

Representative Data from Samples 1-42 appears in FIGS. 1-6 hereto.

Figure 2:
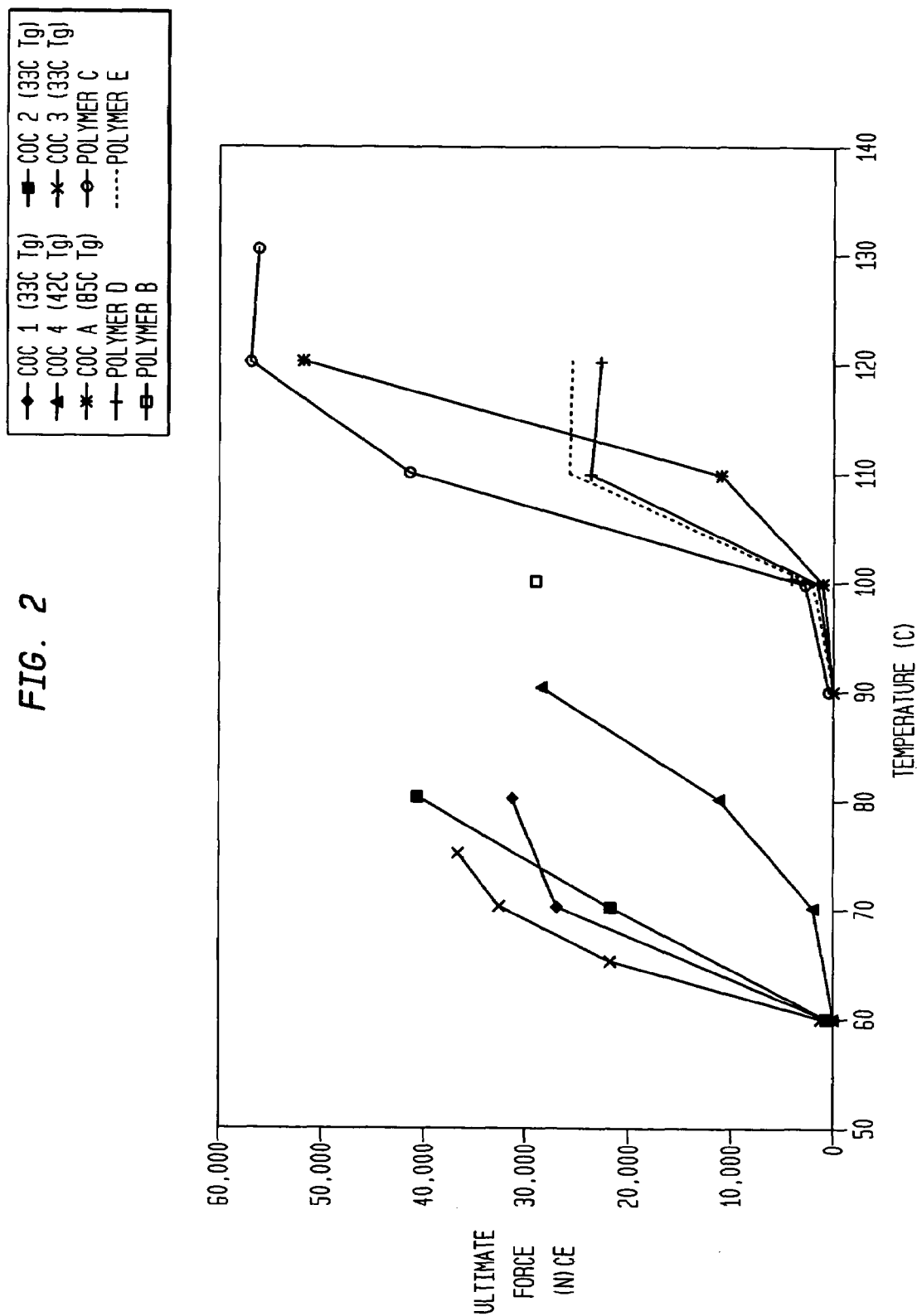
FIG. 2 is a plot of Ultimate Seal Strength versus temperature for various films.

It is seen from Samples 1 through 29 and FIGS. 1 and 2 that the COC films of the invention have high hot-tack strength at low temperature as well as high ultimate strength even when sealed at temperatures as low as 65° C. or so. The term "Good seal" in the Tables in the right hand column indicates that the film referred to exhibited high hot tack strength as well as ultimate strength even when heat sealed at low temperatures (under 65° C.). Coupled with its high volume capability for systems which arc extrusion-limited, the films of the invention provide a unique combination of desirable properties for heat scaling films. Moreover, good seal properties are achieved over a wide temperature range indicating the films are much less sensitive to processing conditions than are prior art films as is seen in FIGS. 5 and 6.

Figure 3:
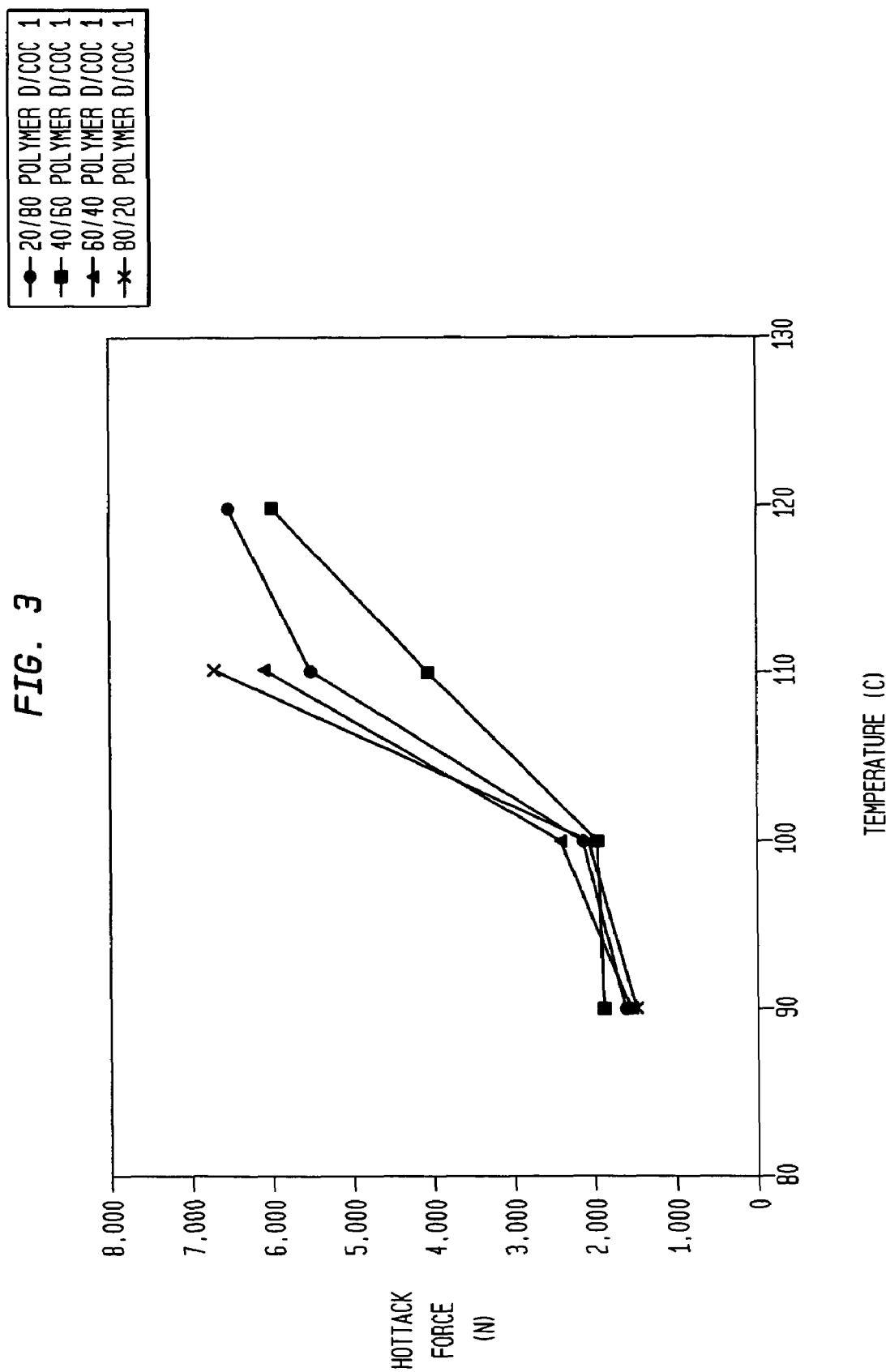
FIG. 3 is a plot of Hot-Tack Seal Strength versus sealing temperature for heat sealable films which are blends of commercial polymer and COC polymer.
Figure 4:
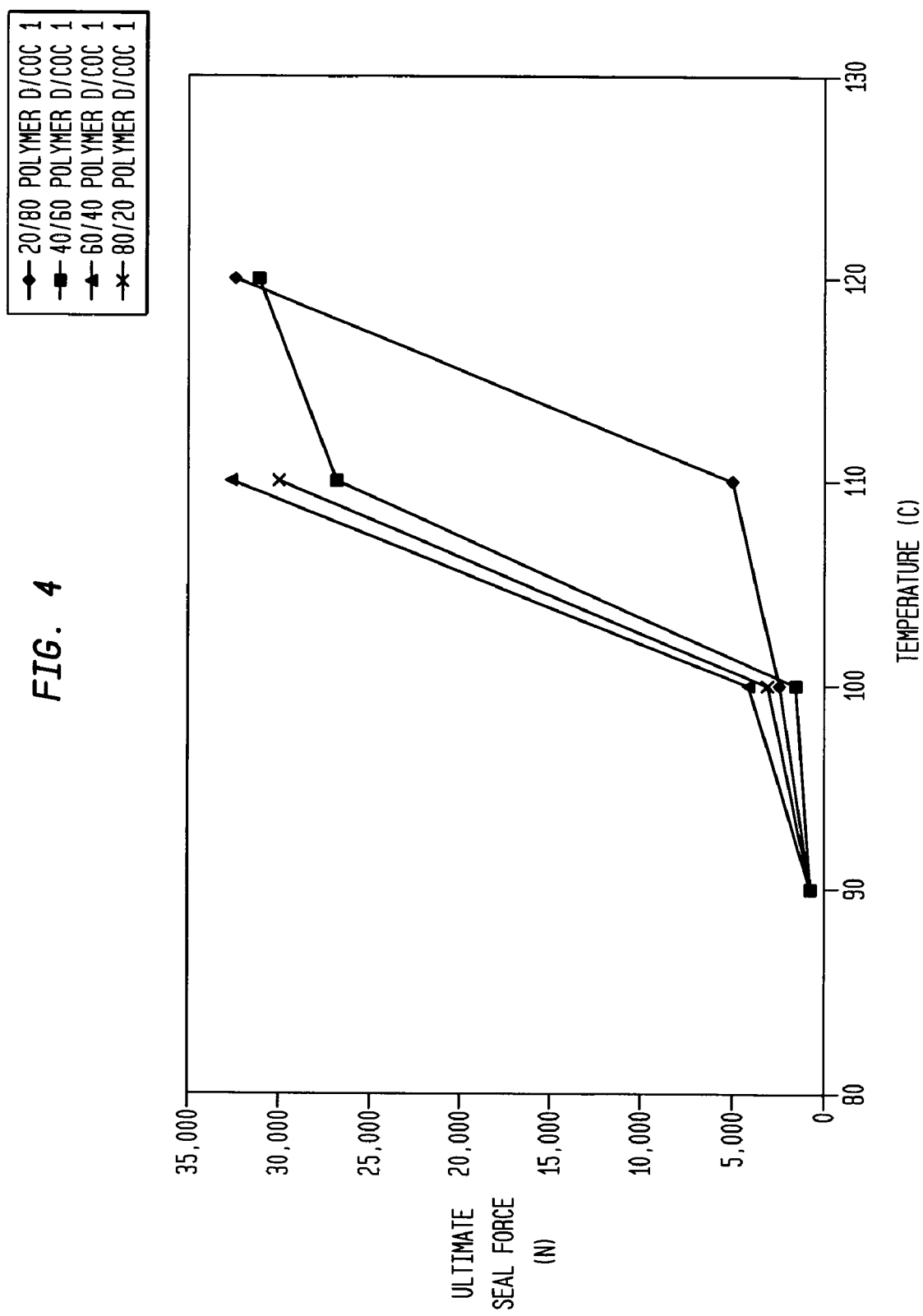
FIG. 4 is a plot of Ultimate Seal Strength versus sealing temperature for heat sealable films which are blends of commercial polymer and COC polymer.

FIGS. 3 and 4 demonstrate that when the heat sealable COC film comprises a blend of a COC polymer along with commercial polymers (instead of the COC polymers of the invention), the hot tack strength and the ultimate seal strength are inferior.

Figure 5:
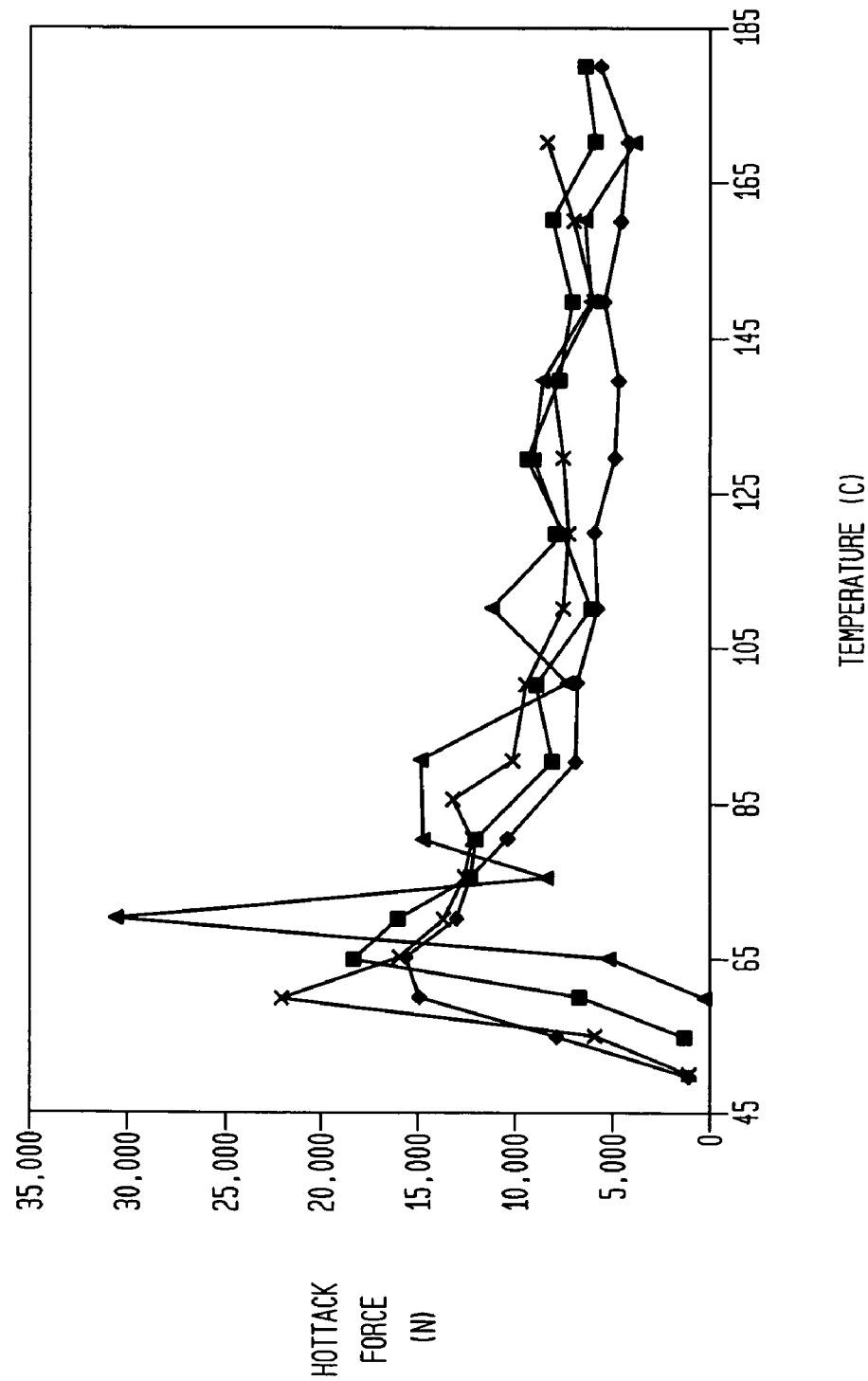
FIG. 5 is a plot of the Hot Tack Seal Strength of a heat sealable film of a COC polymer of the invention at various sealing temperatures.

FIG. 5 shows that hot tack strength is maintained over a broad temperature range for heat sealable COC polymer films of the invention.

Figure 6:
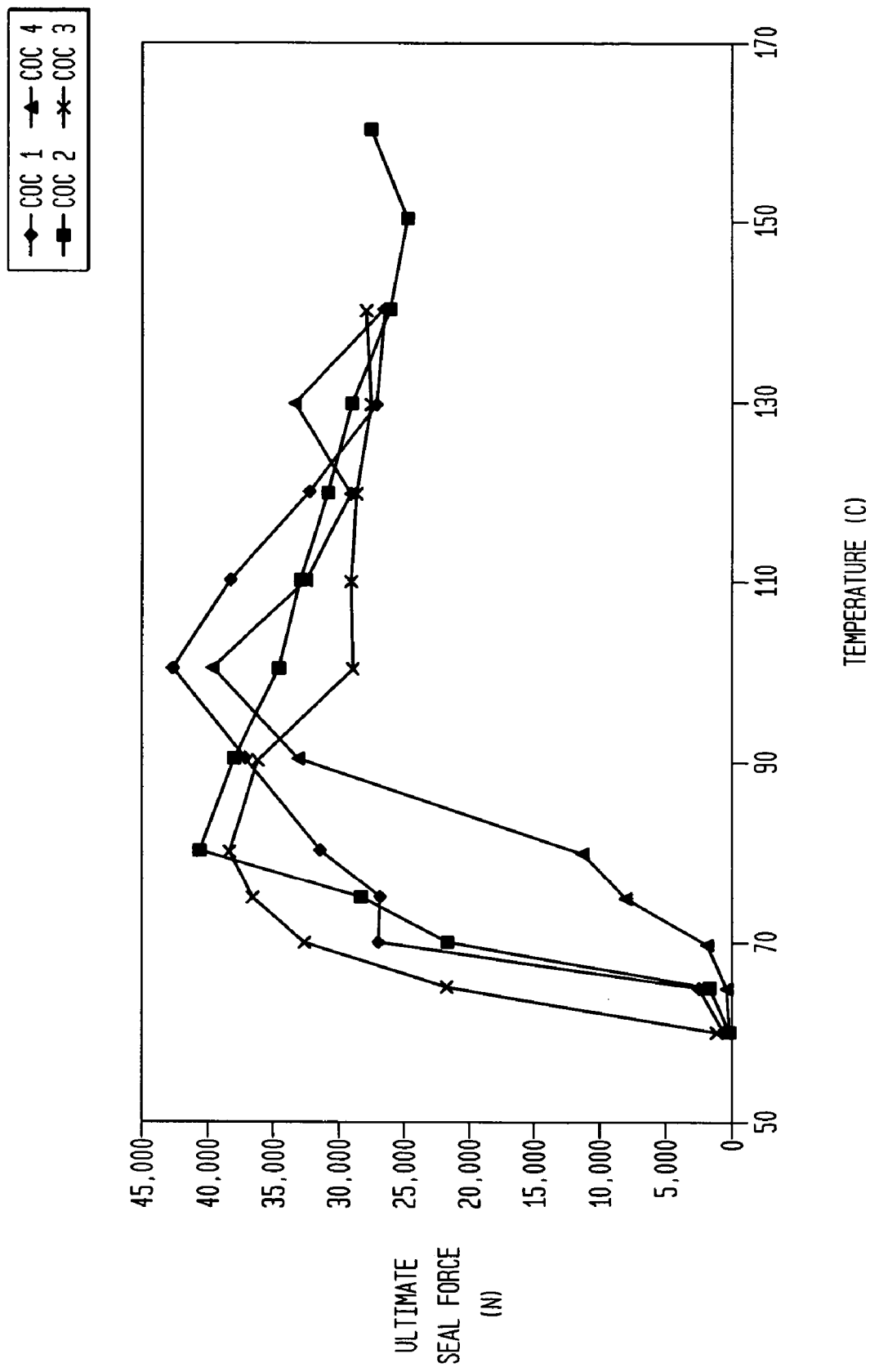
FIG. 6 is a plot of Ultimate Seal Strength versus sealing temperature for films of the invention.

FIG. 6 shows that the COC films of the invention have high ultimate seal strength over a broad temperature range as well.

Figure 7:
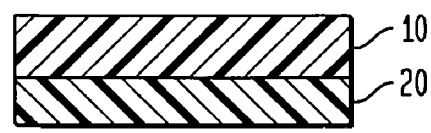
FIGS. 7-11 illustrate various laminates and packaging of the invention.
Figure 8:
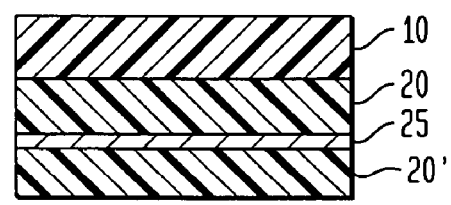
Figure 9:
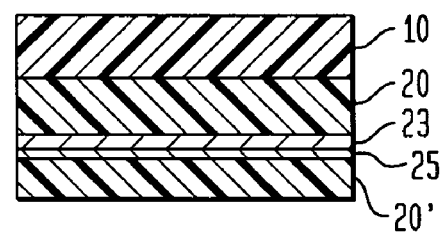
Figure 10:
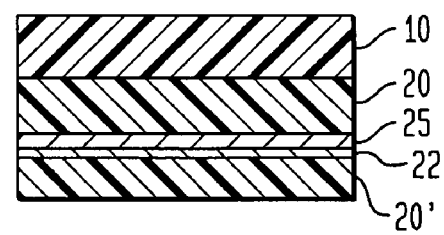
Figure 11:
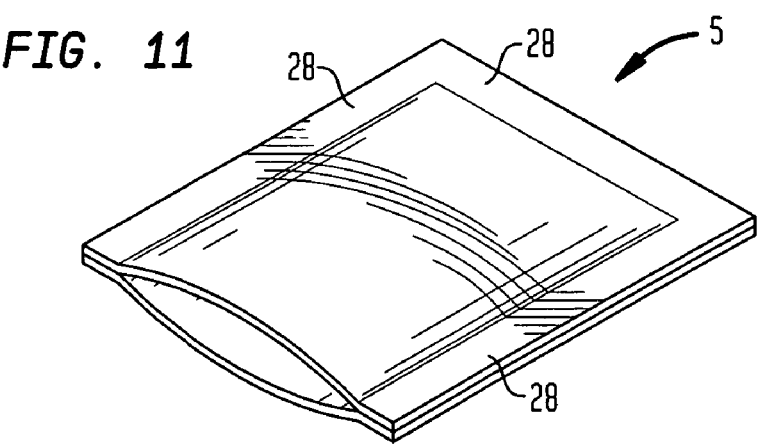

Yet other aspects of the invention relate to laminates and packages ("receptacles") formed by using the inventive heal sealable films of the invention, as well as methods of preparing such package or packaging material. The COC polymer film of the invention has excellent suitability for packing foods or other consumable items. It is also highly suitable for use in the industrial sector, e.g. for producing hot-stamping foils or as a label film. Laminates and packages may be made by any suitable technique such as those described in U.S. Pat. No. 5,755,081 and U.S. Pat. No. 5,783,270, the disclosures of which are incorporated herein by reference. For instance;

FIG. 7 hereto shows a suitably prepared two layer, heat bonded laminate including a thermoplastic layer 10 as well as a heat sealable COC layer 20;

FIG. 8 hereto shows a suitably prepared, four layer laminate including a thermoplastic layer 10, a COC layer 20, an optional layer 25 which may include metal, paper, thermoplastic or the like and another COC heat sealable layer 20';

FIG. 9 hereto shows a suitably prepared, five layer laminate similar to the laminate of FIG. 8, further including a printed layer 23;

FIG. 10 hereto illustrates a suitably prepared, five layer laminate similar to the laminate of FIG. 8, further including an adhesive layer 22; and FIG. 11 shows a package 5 comprising a film or laminate of the present invention which may be any of the laminates of FIGS. 7 through 10, wherein the film is heat sealed at periphery 28.

Modifications to the specific embodiments described above within the spirit and scope of the present invention, as is set forth in the appended claims, will be readily apparent to those of skill in the art.

What is claimed is:

1. A heat sealable film consisting essentially of a film forming norbornene/-ethylene copolymer having a Tg of from about 30C to about 55C, a film of the film forming copolymer exhibiting a hot tack strength of greater than 10N when tested at a heat seal temperature below about 75° C. at a seal pressure of 44 psi, a seal time of 1 second, a cooling time of 0.1 second, a film sample width of 1 inch and a film sample thickness of 2 mil, wherein the peel speed is 200 mm/s, wherein further a film of the film forming copolymer exhibits a hot tack strength of greater than about 5N at all heat seal temperatures between about 75° C. and 150° C. at a seal pressure of 44 psi, a seal time of 1 second, a cooling time of 0.1 second, a film sample width of 1 inch and a film sample thickness of 2 mil, wherein the peel speed is 200 mm/s.

2. A heat sealable film consisting essentially of a film forming norbornene/-ethylene copolymer having a Tg of from about 30° C. to about 55° C., a film of the film forming copolymer exhibiting an ultimate seal strength of greater than 10N when tested at a heat seal temperature below about 90° C. at a seal pressure of 44 psi, a seal time of 1 second, a cooling time of 30 seconds, a film sample width of 1 inch and a film sample thickness of 2 mil, wherein the peel speed is 200 mm/s.

3. The film according to claim 2, wherein the film exhibits a maximum hot tack strength value at a heat sealing temperature below about 75° C. and exhibits a hot tack strength value of at least about 10% of that maximum value at heat sealing temperatures of from about 90° C. to about 150° C.

4. The film according to claim 2, wherein the film exhibits a maximum hot tack strength value at a heat sealing temperature below about 75° C. and exhibits a hot tack strength value of at least about 20% of that maximum value at heat sealing temperatures of from about 90° C. to about 150° C.

5. The film according to claim 2, wherein the film exhibits a maximum hot tack strength value at a heat sealing temperature below about 75° C. and exhibits a hot tack strength value of at least about 30% of that maximum value at heat sealing temperatures of from about 90° C. to about 150° C.

6. The film according to claim 2, wherein the film exhibits a maximum ultimate strength value at a heat sealing temperature below about 90° C. and exhibits an ultimate strength value of at least bout 25% of that maximum value at heat sealing temperatures of from about 100° C. to about 150° C.

7. The film according to claim 2, wherein the film exhibits a maximum ultimate strength value at a heat sealing temperature below about 90° C. and exhibits an ultimate strength value of at least bout 50% of that maximum value at heat sealing temperatures of from about 100° C. to about 150° C.

8. The heat sealable film according to claim 2, wherein a film of the film forming copolymer exhibits a hot tack strength of greater than 10N when tested at a heat seal temperature below about 75° C. at a seal pressure of 44 psi, a seal time of 1 second, a cooling time of 0.1 second, a film sample width of 1 inch and a film sample thickness of 2 mil, wherein the peel speed is 200 mm/s.

9. The heat sealable film according to claim 2, wherein the norbornene is present in the copolymer in an amount of from about 24 to about 30 mole percent and wherein the ethylene is present in an amount of from about 76 to about 70 mole percent.

10. The heat sealable film of claim 2, additionally comprising at least one layer comprising a thermoplastic polymer laminated to the at least one layer consisting essentially of the norbornene/ethylene copolymer.

11. The heat selable film of claim 10, wherein the at least one thermoplastic polymer layer and the at least one layer consisting essentially of norbornene/ethylene copolymer are formed by coextrusion.

12. The film of claim 11, wherein the coextrusion is performed using a flat-film die.

13. The film of claim 11, wherein the coextrusion is performed by a blown film process.

14. The film of claim 10, wherein the at least one thermoplastic polymer layer and the at least one layer consisting essentially of norbornene/ethylene copolymer are laminated by adhesive bonding.

15. The film of claim 10, wherein the at least one thermoplastic polymer is selected from the group consisting of polyester, polycarbonate, polyolefin, polyacrylate, polyestercarbonate, polyamide, polyketone, polyether, polyvinyl, cyclic olefin homopolymer and cyclic olefin copolymer, wherein the at least one thermoplastic layer has a Tg greater than that of the at least one layer consisting essentially of norbornene/ethylene copolymer.

16. The film of claim 15, wherein the thermoplastic is a polyester, polypropylene, polyethylene or nylon.

17. The film of claim 16, wherein the thermoplastic is selected from the group consisting of polyethylene terephthalate and polybutylene terephthalate.

18. The film according to claim 15, wherein the at least one thermoplastic polymer is a norbornene/ethylene copolymer having a Tg of from about 30° C. to about 55° C.

19. The film of claim 10, wherein the laminate is further heat sealed to another layer via the heat sealable norbornene/ethylene polymer layer.

20. A heat sealed package comprising a film of claim 10.

21. The package according to claim 20, wherein the heat seal is effected at a sealing temperature of from about 50 to about 80° C.

22. A heat sealable film consisting essentially of a film forming norbornene/-ethylene copolymer having a Tg of from about 30° C. to about 55° C., a film of the film forming copolymer exhibiting an ultimate seal strength of greater than 10N when tested at a heat seal temperature below about 90° C. at a seal pressure of 44 psi, a seal time of 1 second, a cooling time of 30 seconds, a film sample width of 1 inch and a film sample thickness of 2 mil, wherein the peel speed is 200 mm/s, wherein further a film of the film forming copolymer exhibits an ultimate seal strength of greater than about 20N at all heat seal temperatures between about 90° C. and 150° C. at a seal pressure of 44 psi, a seal time of 1 second, a cooling time of 0.1 second, a film sample width of 1 inch and a film sample thickness of 2 mil, wherein the peel speed is 200 mm/s.

* * * * *